US007899560B2

(12) United States Patent
Eck

(10) Patent No.: US 7,899,560 B2
(45) Date of Patent: Mar. 1, 2011

(54) ELECTRONIC SWITCHING APPARATUS AND METHOD FOR SWITCHING AUTONOMOUS INTERVENTION MEANS FOR AUTOMATICALLY REDRESSING MALFUNCTIONS

(75) Inventor: Vincent Eck, Dussendorf (CH)

(73) Assignee: Swiss Reinsurance Company, Zurich (CH)

( * ) Notice: Subject to any disclaimer, the term of this patent is extended or adjusted under 35 U.S.C. 154(b) by 368 days.

(21) Appl. No.: 11/971,702

(22) Filed: Jan. 9, 2008

(65) Prior Publication Data

US 2008/0164769 A1 Jul. 10, 2008

(30) Foreign Application Priority Data

Jan. 9, 2007 (EP) .................. PCT/EP07/50179

(51) Int. Cl.
*G05B 11/01* (2006.01)
*G05B 9/02* (2006.01)
(52) U.S. Cl. .......................... 700/21; 700/79
(58) Field of Classification Search .......... 700/21, 700/79
See application file for complete search history.

(56) References Cited

U.S. PATENT DOCUMENTS

2008/0164769 A1* 7/2008 Eck .................. 307/116
2009/0063236 A1* 3/2009 Pennay ........................ 705/8
2009/0115588 A1* 5/2009 Stahel et al. ................. 340/438
2009/0171480 A1* 7/2009 Weber ......................... 700/79
2009/0204235 A1* 8/2009 Dubinsky ..................... 700/32
2009/0307012 A1* 12/2009 Delavy et al. ................. 705/4

FOREIGN PATENT DOCUMENTS

WO WO 2007115884 A2 * 10/2007

OTHER PUBLICATIONS

U.S. Appl. No. 12/137,219, filed Jun. 11, 2008, Stahel, et al.

* cited by examiner

*Primary Examiner*—Ryan A Jarrett
(74) *Attorney, Agent, or Firm*—Oblon, Spivak, McClelland, Maier & Neustadt, L.L.P.

(57) ABSTRACT

The invention proposes an electronic switching apparatus (11) and an appropriate method for electronically switching two autonomous emergency intervention systems (10, 12) for automatically redressing malfunctions in locally arranged installations, where a sensor system (301, 302, 303, 304) in an installation is used to detect a malfunction event in the installation and where transmitted malfunction parameters are taken as a basis for selecting and activating dedicated intervention means (101, . . . , 105) for specific operation and faults using the first emergency intervention system (10). Upon activation, the intervention means (101, . . . , 105) are used to automatically redress the malfunction in the affected installation. When synchronized signal threshold values for a fault memory module are detected, the enabling of the emergency intervention system (10/12) is changed and adapted for specific installations and users by means of an activation apparatus (112) in the electronic switching apparatus (11).

16 Claims, 2 Drawing Sheets

Figure 1:
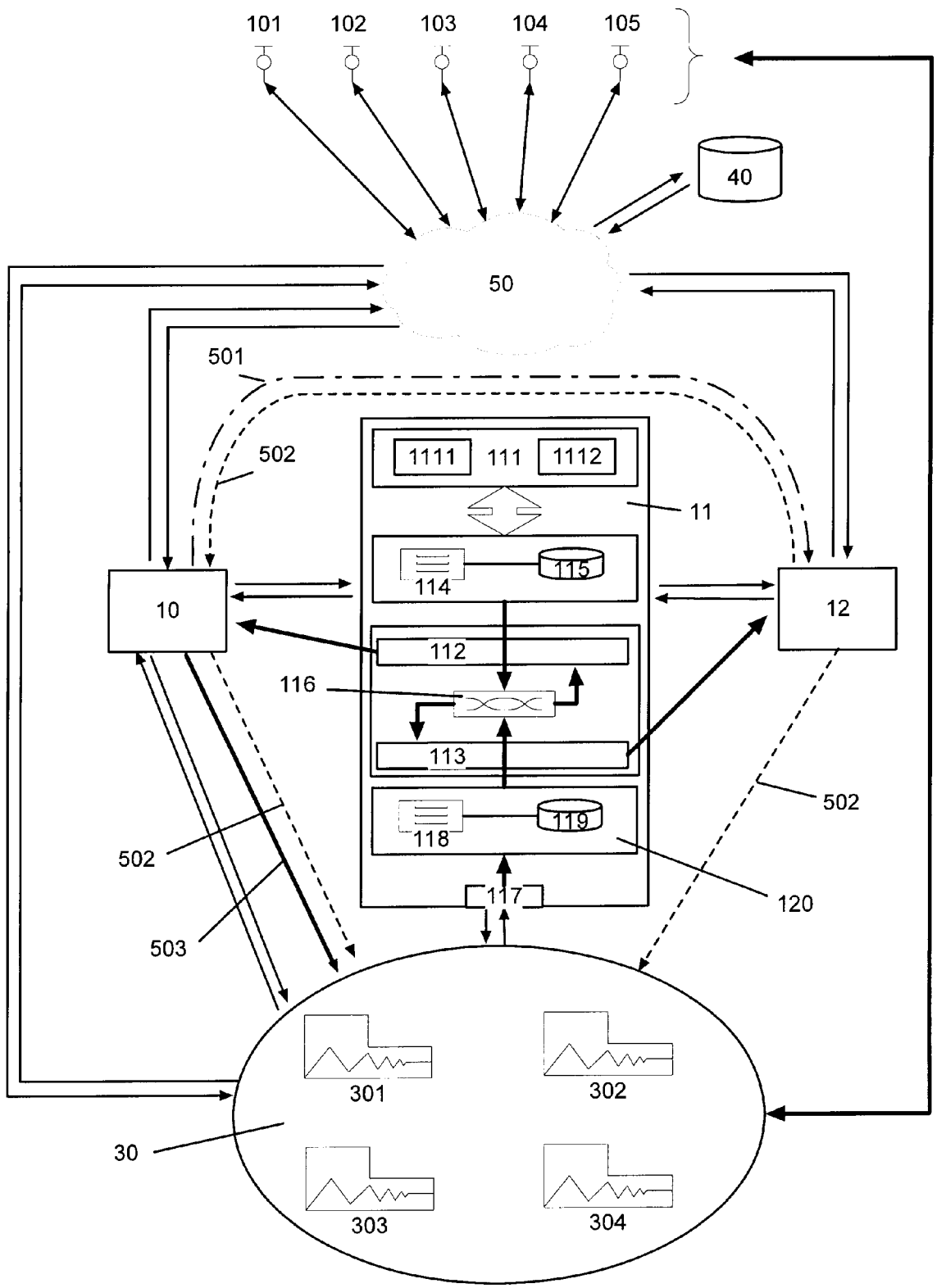

ELECTRONIC SWITCHING APPARATUS AND METHOD FOR SWITCHING AUTONOMOUS INTERVENTION MEANS FOR AUTOMATICALLY REDRESSING MALFUNCTIONS

The present invention relates to a system and an appropriate method for electronically switching two autonomous emergency intervention systems for automatically redressing malfunctions in locally arranged installations, where a sensor system in an installation is used to detect a malfunction event in the installation and where transmitted malfunction parameters are taken as a basis for selecting and activating dedicated information means for specific operation and faults using the first emergency intervention system, said intervention means being used to redress the malfunction in the installation.

PRIOR ART

Breakdowns and operational restrictions in individual apparatuses in large complex systems, or else malfunctions in whole installations, can today result in unforeseen effects, not just for the operation in question but also for operations which are associated with it or dependent on it. A typical example is a fire at a chip manufacturing operation belonging to an Asian manufacturer a few years ago. The operation of a wide variety of other production installations in the hardware sector was affected or paralyzed. These sometimes global dependences for the functioning of operations have raised an increased need for rapid, automated malfunction identification and early identification and also automatic redressing of malfunctions. For differentiated signal generation for the purpose of activating necessary intervention means, however, human interaction was a necessary prerequisite for a long time in many areas of technical flows and operations as soon as the complexity of the apparatuses involved, detected measurement parameters or controllable processes and interactions with the environment exceeded a certain level. Particularly in the case of control, inspection and monitoring of dynamic and/or nonlinear processes, automation eluded the prior art. Often, it was particularly the nonlinearity which deprived conventional apparatuses of the ground for automation. Many technical implementations of the widest variety of types of early warning apparatuses, image and/or pattern recognition apparatuses, particularly in the case of analog measurement data or when the apparatus needs to be self-organizing, are in most cases still not achieved satisfactorily in the prior art today. Almost all natural processes take place at least to some extent in nonlinear fashion and tend to have an exponential behavior which is almost impossible to control with technical means outside of a narrow linear equilibrium range. In this context, one need merely consider the American space shuttle Challenger (OV-99) disaster at NASA on Jan. 28, 1986. A malfunction in a sealing ring on a solid-fueled rocket (booster) meant that the space transportation system STS-51-L broke apart in just 73 seconds without any interaction at all being possible. Efficient and reliably operating early warning signal generation and automated redressing of malfunctions can be important to survival for many technical devices in all possible areas, as shown. These range from complex technical apparatuses such as aircraft, robots, assembly lines etc., each with many thousands of sensors and measurement signals, through to monitoring and control systems based on uncontrollable environmental influences, such as meteorological (storms, hurricanes, floods), geological (earthquakes) and economy-based (stock exchange) influences.

The underlying technical problems range from differentiated, automated detection of the measurement parameters, their specific selection and filtering and buffering of the data, realtime weighting, detection of correlations, analysis and triggering through to signal generation, selective activation or enabling of appropriate apparatuses and possible feedback of time-dependent, dynamic actions of the apparatuses. When a technical problem of this kind eludes the prior art, human interaction, particularly at the interfaces between two technical units, inevitably plays a key role. The nonlinear neural structure of the human brain was for a long time better suited to the likewise frequently nonlinear processes in problem recognition, monitoring, signal generation or technical tuning of the apparatuses than corresponding technical, automated apparatuses. Today, human interaction comes up against boundaries and problems in many areas, however, and the prior art would not have afforded any appropriate alternative. First, the quantity of measurement parameters recorded by sensors, image capture units or else of existing, historical data has increased to an unforeseeable degree in recent years. It is not comparable with the area of data as was still available approximately 10 years ago. Frequently, this large quantity of measurement parameters no longer allows all-inclusive, reliable and/or reproducible monitoring by a human. Secondly, the reaction times which are required for the systems have become so short for many applications that human interaction on these systems is no longer sufficient merely as a result of the short reaction times and/or the quantity of recorded measurement parameters. In the case of systems with a realtime reaction time as a necessary prerequisite for optimum operation, such as control automation and robotics, what has been said becomes obvious. As a consequence of the operation, the signal generation should, if necessary, also allow dynamic and/or feedback-controlled adjustment of the system, of operation and/or of signal generation. In many technical application areas, this is no longer possible by means of human interaction. In the case of complex systems, human interaction also has the drawback that its susceptibility to error does not rise linearly on the basis of the complexity. The behavior or operation of the system becomes unpredictable. Unexpected interruptions to operation or system crashes are the result. There are numerous recent examples of this, such as system-generated interruptions to operation in systems coupled to human interaction. By way of example, aircraft crashes which are unforeseeable despite all the emergency intervention apparatuses and systems (e.g. Swissair MD11 crash ahead of Halifax on Nov. 3, 1998 or the air disaster at Überlingen in July 2002), stock exchange crashes with a worldwide collapse of financial systems and financial institutes etc. etc.

The aforementioned drawbacks have created an increased need in industry for technization and automation by means of efficient signal-generation, alarm, monitoring and/or operational intervention systems or apparatuses which are able to effectively intercept such events or their effect without the need for any human interaction. The apparatuses should include the option of dynamic self-organization in the event of altered conditions or altered technical effects of systems. In this context, differentiated measurement parameter recording and signal generation with appropriate intervention apparatuses for redressing malfunction and for dynamic activation or for signal transmission should have as short a reaction time as possible or even a reaction time in real time. It is clear to a person skilled in the art that pure software-based implementation (where at all possible) and/or increase in the available processor power (computing power) is not sufficient for the technical implementation of the automation in the case of most systems. Particularly in the case of the aforementioned complex system with a nonlinear process background and a large volume of generated measurement data with unknown dependences and correlations, the technization and automation elude mere software-based implementation on a computer. In this context, there are therefore very few cases in which the technical implementation is a commonplace matter for a person skilled in the art to find without any assistance. This is so even when the individual technical apparatus elements used should be known in the prior art. Specifically, this also relates to the mode of action of these apparatuses. Process cycles usually cannot be simulated or are difficult to simulate in interaction with complex systems, which means that the technical cooperation of the apparatus elements used, even though they may be known individually or commonplace, are not foreseeable and not commonplace for a person skilled in the art in terms of their action and interaction on the process cycles or the apparatuses which are being controlled. Stated conversely, since the action of an apparatus is not foreseeable, the technical implementation or combination of the apparatus elements, of the selection of the influencing parameters etc. in the case of such processes is usually not foreseeable and therefore not commonplace for a person skilled in the art.

Malfunctions and interruptions to operation in the case of sensitive, automated systems are meant to be prevented or at least detectable and redressable as quickly as possible by means of the present apparatus. Usually, it is a necessary condition for operation that such systems identify and preventively counteract the possibility of malfunctions occurring in good time as an early warning system. In this context, a feature of such intervention apparatuses may be not just the type of intervention means (e.g. catastrophe resources such as building and construction apparatuses, alarm apparatuses such as siren control apparatuses, malfunction means such as supply apparatuses or supply control apparatuses (water control equipment, fuel and lubricant control equipment, ducting systems with pump and sluice control apparatuses etc.)) but also the way in which the control parameters measured by the recording apparatuses and detection apparatuses are processed and technically implemented for controlling activation units for the intervention means or alarm means. It is precisely the technical implementation which results in barely negotiable technical problems in today's complex systems with equally complex dependences.

Another difficulty is that the available volume of data can come from a wide variety of heterogeneous, analog or digital recording apparatuses and detection apparatuses, such as wind speed sensors, satellite pictures, water level sensors, water and wind temperature sensors etc. Similarly, technical problems can be found in that the operation of the cited signal generation apparatuses, alarm, control and/or operational intervention apparatuses usually interferes or correlates not only with/to nonlinear processes in the environment but also with/to dynamically altered processes from other automated or semi-automated processes in apparatuses. It is entirely possible for the interaction itself also to come from processes on the stock exchange, in the insurance industry or in indemnity-coverage and risk-control systems, for example, which are on the fringe of patenting, since they are usually counted as business methods. The differentiated signal-generation and control/monitoring apparatus itself is always technical and, on account of its interaction, in most cases not commonplace for a person skilled in the art, however, since the functioning of the possibly known, individual components of the apparatus does not allow him to infer the mode of action of the apparatus when interacting with the nonlinear processes, or allows him to infer it only with difficulty, or conversely allows him to infer the necessary interaction of the individual components for the apparatus from the processes ordinarily.

Coupled or noncoupled malfunction apparatuses, intervention systems and appropriately integratable signal-generation or alarm apparatuses, as well as emergency-control or malfunction apparatuses, are known in different variations in the prior art. Equally known is the division of malfunction corrections, e.g. in the case of at least partially cash-ready-based intervention systems. One applicable example is the international patent specification WO 2005/091741 A2/A3. Controlled segmentation of the interventions in the event of malfunctions allows the safety and efficiency of the systems involved to be improved. International patent specification WO 2006/083791 A2/A3 shows a different kind of segmentation of the interventions in the event of malfunctions for the purpose of operational protection by virtue of said interventions being transferred to third parties by the system, at least to some extent automatically, while appropriate settlement receipts are generated and electronically allocated. Another example of similar automated segmentation is shown by the international patent application PCT/US04/37000 (US 2007/0112604 A1). In this case too, the system generates the segmentation and allocates it accordingly. Finally, the international patent specification WO 00/65470 A2 shows a system which allows automated, variable segmentation and coupling between emergency intervention apparatuses. In this context, it can even be possible to alter the segmentation dynamically when malfunctions occur. In addition, by way of example, the fitting of a suitable sensor system and control apparatuses directly in the operating installation with transmission of measurement signals to a central control apparatus is also known. By way of example, it is known practice to transmit location-dependent electrical signals from these control apparatuses to a central unit periodically or upon request for the purpose of automated alarm triggering. The international patent specification WO 2004/111962 A2/A3 discloses an alarm apparatus of this kind, where recording apparatuses are used to record measurement parameters and to transmit them to a central unit which, in the event of malfunctions, automatically generates an alarm signal and transmits it to the relevant operational intervention means. The German patent specification DE 199 51 076 A1 shows a signal-generation and activation apparatus in which, in emergency situations, signals are transmitted to a central unit which generates appropriate control commands for activating communication and alarm apparatuses in the motor vehicle. A similar situation is known for industrial installations of all kinds. The operation of technical installations is subject to a multiplicity of possible malfunctions or risk events which result in malfunctions. By way of example, different use or use of different locations often results in different types of malfunctions and/or probabilities of malfunctions. Examples of such malfunctions are accidents, wear and/or abrasion on account of environmental influences (e.g. hail etc.) and/or danger to people and property on account of crimes, such as theft, burglary, vandalism and assault. In addition to the already stated causes of malfunctions, the use and operation of installations and apparatuses may also entail risks to people and property on account of terrorist activities or fighting, e.g. in geographical regions with military or political conflicts. Similarly, the owners and operators at least partly influence the probability of malfunctions during the operation of apparatuses. An owner and operator can minimize the probability of malfunctions through careful operation and correct assessment. In addition to the effects of malfunctions for the owner and/or operator, the malfunction in an apparatus may, however, also affect third parties which have a technical or economic dependence on the latter's operation. Often, such secondarily affected parties have little or no control over how an operator operates the installation or apparatus, even though these parties may be greatly affected by the use of the vehicle. The dynamic signal generation for monitoring and transmission to other units and adjustment of these units is shown by the international patent specification WO 2007/133991 A2, for example. When trigger events occur, the detection apparatuses installed in the apparatus in dedicated fashion transmit signal data to an activation apparatus. These can also include partially automated or unautomated insurance systems, inter alia. Something else which is known for malfunctions is the interaction of dynamically controlled, user-specific signal-generation apparatuses with partially automated or unautomated switching or activation apparatuses, which can comprise at least one monetary-based memory. One applicable example from the prior art is the international patent specification WO 97/27561 A2/A3 (cf. EP0877992). One of the basic problems of all of these systems is that automation and/or automated control of the control and operational intervention systems are usually themselves very unstable and susceptible to fault. This is frequently also down to the high level of complexity of the associated technical installations or their interaction with the environment. Serial failures and/or correlated breakdowns or faults, e.g. as a result of environmental influences, are difficult or even impossible to detect in advance.

TECHNICAL OBJECT

It is an object of this invention to propose an electronic switching apparatus and method for an emergency apparatus for automatically redressing malfunctions which do not have the aforementioned drawbacks. In particular, it is meant to be possible to use a suitable sensor system for the emergency intervention system to automatically detect malfunctions which occur and to use an activation apparatus in the electronic switching apparatus to automatically generate dedicated activation signal data on the basis of the detected malfunction and to transmit them to specifically selected intervention means. The intervention means specifically selected by the emergency intervention system are intended to be able to be used to redress the malfunction efficiently and with a high level of dependability and without any interaction by the user. In particular, the electronic switching apparatus is intended to have advantages in terms of speed, predictability of performance and savings in terms of time involvement.

The present invention achieves this aim particularly by means of the elements of the independent claims. Further advantageous embodiments can also be found in the dependent claims and the description.

In particular, these aims are achieved by the invention in that the electronic switching of two autonomous emergency intervention systems for automatically redressing malfunctions in locally arranged installations involves a sensor system in an installation being used to detect a malfunction event in the installation and transmitted malfunction parameters being taken as a basis for selecting and activating dedicated intervention means for specific operation and faults using the first emergency intervention system, said intervention means being used to redress the malfunction in the installation, wherein the electronic switching apparatus is connected bidirectionally to the first and second autonomous emergency intervention systems, the switching apparatus being used to synchronize switching signal parameters between the first emergency intervention system and the second emergency intervention system, which switching signal parameters comprise at least one first synchronized signal threshold value parameter and a second synchronized signal threshold value parameter, wherein an incrementable stack memory in a protected memory module in the electronic switching apparatus is allocated a multiplicity of installations, an interface module in the electronic switching apparatus being used to transmit predetermined activation parameters from the installation periodically via a network and the stack memory being incremented in steps on the basis of the transmitted activation parameter, wherein a switching module in the electronic switching apparatus is used to detect a stack memory level value for the stack memory and the first emergency intervention system is enabled for automatically redressing malfunctions using dedicated activation signals from the switching module if the stack memory level value reaches a defined memory threshold value, with at least portions of the stack memory being allocated to the second emergency intervention system by means of the switching apparatus on the basis of the synchronized switching signal parameters, wherein a filter module comprising a fault memory module and a fault stack memory in the electronic switching apparatus is used to decrement a predefined fault stack memory value on the basis of the dedicated activation signals, the activation signals being generated with a quantitative weighting in line with the malfunction parameters on the basis of the activation of the intervention means using the first emergency intervention system, wherein when the first synchronized signal threshold value parameter is reached by the fault stack memory value for the fault stack memory, the enabling of the first emergency intervention system is interrupted by means of the first activation apparatus in the electronic switching apparatus and the second emergency intervention system is enabled by means of the second activation apparatus in the electronic switching apparatus, and wherein when the second synchronized signal threshold value parameter is reached by the fault stack memory value, the enabling of the second emergency intervention system is interrupted by means of the second activation apparatus in the electronic switching apparatus and the first emergency intervention system is enabled for redressing malfunctions by means of the first activation apparatus. For the purpose of activation, the first and/or second activation apparatus can be used to generate at least one electronic activation signal on the basis of the transmitted malfunction parameters, and the activation signal can be transmitted to the intervention means and/or emergency intervention apparatuses. The invention has the advantage that it remains totally stable even with automation, particularly in the case of events which are difficult to detect and have low statistical occurrence. Another advantage is that a reduction in the operational protection can be achieved for the emergency intervention systems, which makes the system more competitive and better suited. The automation allows the system to be matched to new circumstances quickly and if need be dynamically. This has not been possible in this way in the prior art to date. In other words, the inventive solution achieves technical optimization and automation of the systems which have not been known in the prior art to date.

In one variant embodiment, the electronic switching apparatus comprises a history module, wherein a history module is taken as a basis for generating stored, chronologically coupled malfunction parameters and/or activation parameters in sync first synchronized signal threshold value parameters from the switching signal parameters using the electronic switching apparatus. The history module can be taken as a basis for synchronizing and generating stored, chronologically coupled malfunction parameters and/or activation parameters second synchronized signal threshold value parameters from the switching signal parameters using the electronic switching apparatus. This variant embodiment has the particular advantage that the synchronization can involve the activation parameters being determined in advance and then being used as a basis for the synchronization. A first history module with the data store may also be associated with the first emergency intervention system, for example, while a second history module with a data store is associated with the second emergency intervention system. Nevertheless, both history modules can belong to the electronic switching apparatus, for example.

In another variant embodiment, the malfunction parameters and/or the activation parameters may comprise additionally storable and protected data tokens with cash sum values. Such protected tokens are technically simple to handle and to be exchanged by the apparatuses. By way of example, the data token may be generated in encrypted and/or electronically signed form. The encryption can be provided by means of public key cryptography and/or SSL (Secure Sockets Layer) and/or HTTPS, for example.

In another variant embodiment, the electronic switching apparatus may comprise a clearing module, wherein the malfunction parameters are taken as a basis for transmitting clearing data to the clearing module of the electronic switching apparatus, which clearing data comprise settlement data for the activation of the second emergency intervention system and which clearing data are associated with the first emergency intervention system. By way of example, the electronic switching apparatus may be in a form such that the second emergency intervention system is enabled for activation by means of the clearing module only on the basis of received clearing data. This variant embodiment has the advantage that at least partial operational intervention or control equalization or remuneration can be performed automatically by means of such a clearing module. The clearing module may be part of the switching apparatus but may also be arranged externally, for example as a network unit. The clearing module can be used to enable the second emergency intervention system for activation in line with the received clearing data, for example, and/or to feed it back to the first emergency intervention system.

In another variant embodiment, the activation and synchronization apparatus may comprise means for encrypted and access-controlled transmission of the activation signal data and/or the activation parameters and/or the, where the access-controlled activation pulse can be decrypted by generating a data token in line with transmitted access request data and transmitting it to the relevant emergency intervention apparatus, the data token respectively comprising data which comprise at least portions of an appropriate key for the access-controlled encrypted activation signal data, or comprising an access permit for a key for decrypting the activation signal data. This variant embodiment has, inter alia, the advantage that the apparatus allows a high security standard and a technically stable response in the exchange between the systems. By way of example, the data token may be encrypted and/or electronically signed. In particular, the encryption can be performed using public key cryptography, particularly SSL (Secure Sockets Layer) or HTTPS, for example.

At this juncture, it should be stated that the present invention relates not only to the inventive method but also to an electronic switching apparatus for carrying out this method.

Variant embodiments of the present invention are described below with reference to examples. The examples of the embodiments are illustrated by the following appended figures:

FIG. 1 shows a block diagram which schematically shows an electronic switching apparatus 11 which can be used to implement the invention. A sensor system 301, 302, 303, 304 in an installation is used to detect a malfunction event in the installation, and transmitted malfunction parameters are taken as a basis for selecting and activating dedicated intervention means 101, . . . , 105 for specific operation and faults using the first emergency intervention system 10. The intervention means 101, . . . , 105 are used to redress the malfunction in the installation.

Figure 2:
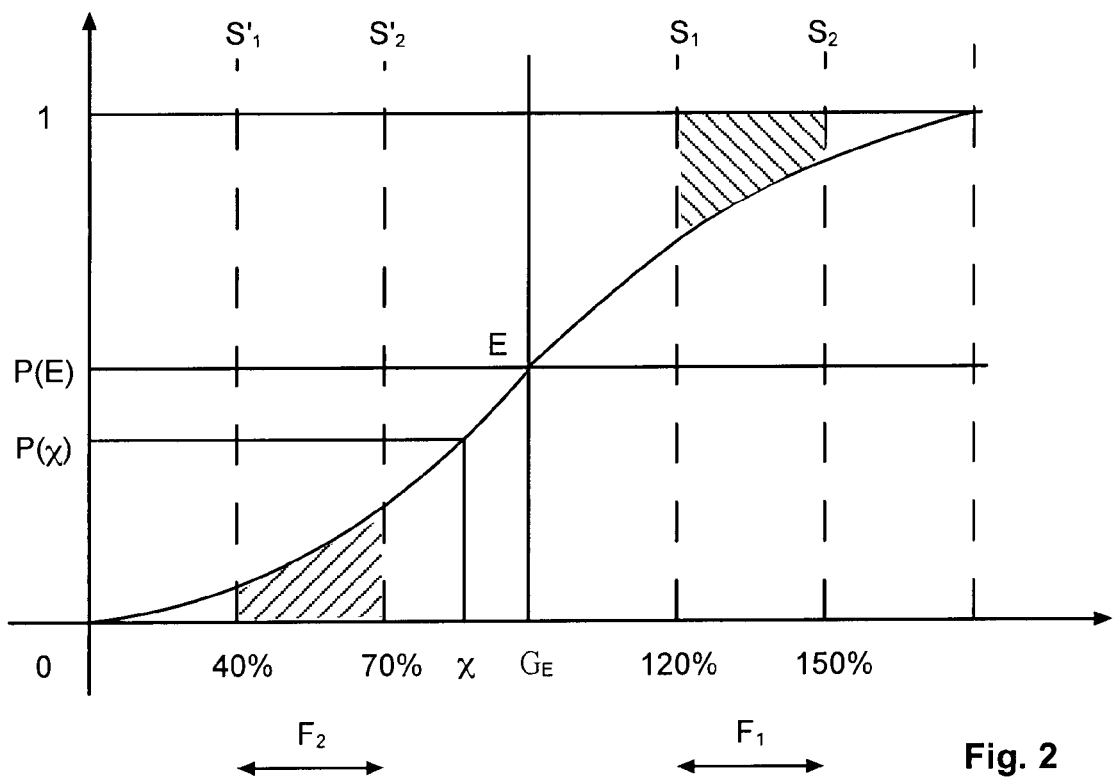

FIG. 2 illustrates an example of a probability distribution for instances of activation of the first emergency intervention system 10. The values for the ratio of the malfunctions to the stack memory level value for the stack memory 114 are shown by the abscissa and the values for the probability are shown by the ordinate. A value x for the ratio of the activation or malfunctions to the stack memory level value for the stack memory 114 corresponds to the probability P(x), which, by way of example, is the probability for the first emergency intervention system 10 that, in the course of a unit of time (e.g. a year), the ratio to the stack memory level value loses a particular percentage of transmitted malfunction parameters of between 0% and x %, i.e. the electronic switching apparatus changes over.

Figure 3:
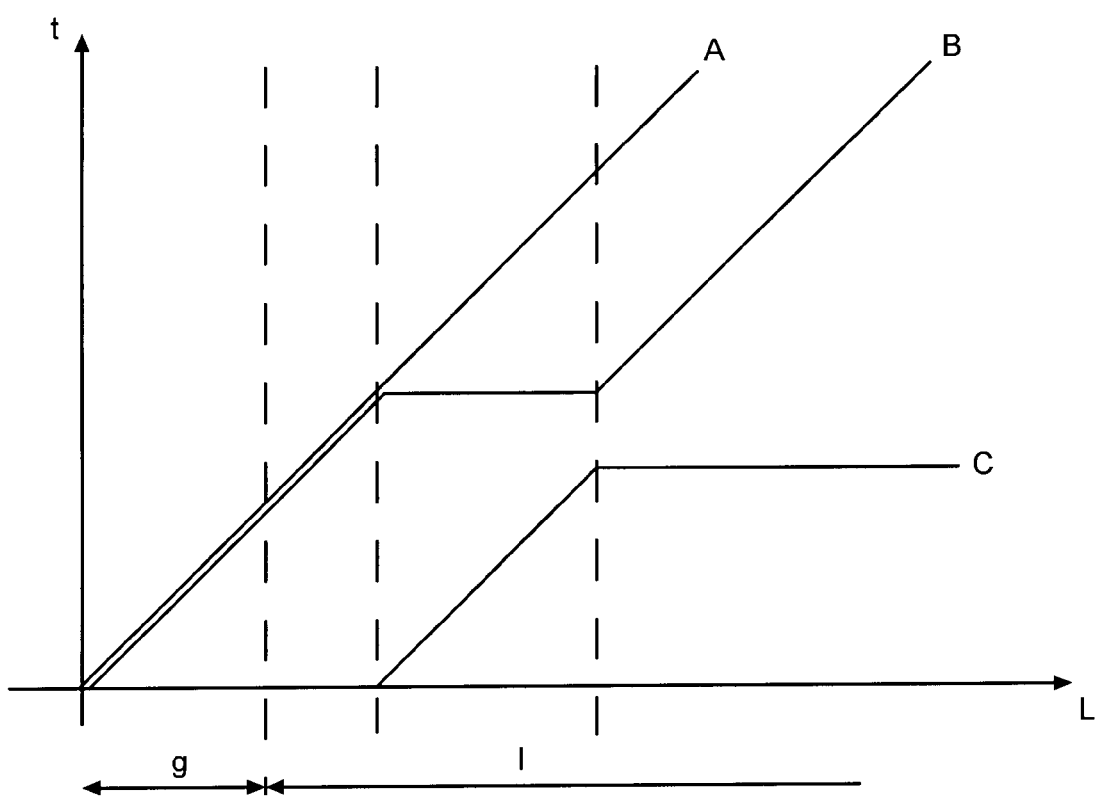

FIG. 3 likewise uses the curve to illustrate an example of a ratio of transmitted malfunction parameters to the stack memory level value for the stack memory 114, which is less than 1, i.e. the rate of operational interventions as a function of time. The axis L references the decremented fault stack memory value using the dedicated activation signals and/or malfunction parameters as a function of time t. A is the effectively arising rate. B shows the intervention means activated by the first emergency intervention system 10 and C shows the intervention means activated by the second emergency intervention system 12. The area g shows the ratio of transmitted malfunction parameters to the stack memory level value greater than 1, while I shows the area in which the ratio is less than 1.

FIG. 1 illustrates an architecture such as can be used to implement the invention. FIG. 1 shows a block diagram which schematically illustrates an inventive apparatus and a corresponding method for electronically switching two autonomous emergency intervention systems 10, 12 for automatically redressing malfunctions in locally arranged and/or operated installations and/or apparatuses 30. Installations are to be understood to mean any type of technical installations and apparatuses, moving and nonmoving. By way of example, installations may comprise production apparatuses of all kinds, technical aids and machines, motor vehicles of all kinds, appropriate structures with technical means etc. The automated emergency intervention system 10/12 may comprise, by way of example, automatically triggered erasure systems, power-interruption or emergency-generator systems, operational control systems with automated control and/or alarm apparatuses, signal-conversion or relay systems for automated alarm or monitoring-control triggering etc. For the purpose of automated emergency intervention in the event of malfunctions, the emergency intervention system 10/12 may have a unidirectional or bidirectional connection to the installations 30 by means of a monitoring and/or alarm apparatus. The connection can be made by means of an air-based and/or land-based connection, particularly in hardwired and/or wireless form.

A sensor system 301, 302, 303, 304 in an installation is used to detect a malfunction event in the installation. By way of example, the sensor system 301, 302, 303, 304 may comprise smoke and/or heat and/or humidity and/or motion and/ or sound sensors. The sensor system 301, 302, 303, 304 may also comprise at least one scanning unit with an image recognition module, for example. The sensor system 301, 302, 303, 304 may also comprise a position-finding module, for example, which position-finding module is used to generate position coordinate parameters for the current location of the installation or apparatus and to transmit them to the electronic switching apparatus 11 using the monitoring and/or alarm apparatus in the installation 30. In particular, the sensor system 301, 302, 303, 304 may also comprise means for recording user-specific measurement parameters for the operator of the installation (e.g. blood pressure, alcohol, eye tracking, skin surface tension, blood sugar, heartbeat etc.).

On the basis of transmitted malfunction parameters, the first emergency intervention system 10 is used to select and activate dedicated intervention means 101, . . . , 105 for specific operation and faults. By way of example, the transmission can be effected via a network 50. The communication network 50 comprises a GSM or UMTS network, for example, or a satellite-based mobile radio network and/or one or more landline networks, for example the public switched telephone network, the worldwide Internet or suitable LAN (Local Area Network) or WAN (Wide Area Network). In particular, it also comprises ISDN and XDSL connections. Intervention means 101, . . . , 105 are used to redress the malfunction in the installation and/or apparatus. Activation modules in the emergency intervention apparatuses 10/12 and/or in the electronic circuit 11 can be used to generate dedicated activation signal data on the basis of the detected malfunction and to transmit them to an appropriate, automated intervention means 101, . . . , 105. The activation modules may have a unidirectional or bidirectional connection to the automated intervention means 101, . . . , 105. This allows fully automated monitoring, control and intervention. The intervention means 101, . . . , 105 is used to redress the malfunction, so that the installation 30 can resume full operation for the user. The automated intervention means 101, . . . , 105 may comprise, by way of example, automatically triggered erasure systems, power-interruption or emergency-generator systems, operational control systems with automated control and/or alarm apparatuses (particularly for alarm triggering for police, military, catastrophe or invalid-rescue assignment), signal-conversion or relay systems for automated alarm or monitoring-control triggering, control and regulation systems for ducting or other pipe systems etc.

The electronic switching apparatus 11 has a bidirectional connection to the first and second autonomous emergency intervention systems 10, 12. The connection can be made via a network interface 117 directly or via the network 50, as in the case of the connection to the sensor system 301, 302, 303, 304, for example. The electronic switching apparatus 11 is used to synchronize switching signal parameters 111 between the first emergency intervention system 10 and the second emergency intervention system 11. The switching signal parameters 111 comprise at least one first synchronized signal threshold value parameter 1111 and a second synchronized signal threshold value parameter 1112. For the purpose of synchronization, an analysis module in the electronic switching apparatus 11, for example, can be used to comprises two storable threshold value parameters ($S_1$) and ($S_2$) in a first range ($F_1$) of expected values, for which the second emergency intervention system 12 can be activated, and comprises two further storable threshold value parameters ($S_1'$) and ($S_2'$) in a second range ($F_2$) of expected values, for which expected values the first emergency intervention system 10 is reactivated. The parameters ($S_1$), ($S_2$), ($S_1'$) and ($S_2'$) may be variable using synchronization modules, for example, the synchronization modules activating the analysis module until the parameters are within a determinable variance. Parameterized malfunction probabilities for a multiplicity of installations 30 can be transmitted to the emergency intervention system 10/12 and/or the electronic switch apparatus 11 using appropriate parameters, for example. The second range ($F_2$) comprises expected value parameters for malfunction probabilities, for which expected value parameters the stack memory comprises nondecremented malfunction parameters when the determinable and synchronized time window expires. The values of ($S_1'$) and ($S_2'$) may comprise between 40% and 70% of the probability of one or more malfunctions arising, for example. An incrementable stack memory 112 in a protected memory module 115 in the electronic switching apparatus 11 is allocated a multiplicity of installations 30. An interface module 117 in the electronic switching apparatus 11 is used to transmit predetermined activation parameters from the installation periodically via a network 50, and the stack memory 112 is incremented in steps on the basis of the transmitted activation parameter. A switching module 116 in the electronic switching apparatus 11 is used to detect a stack memory level value for the stack memory 114. The first emergency intervention system 10 is enabled for automated addressing of malfunctions using dedicated activation signals from the switching module 116 if the stack memory level value reaches a defined memory threshold value, with at least portions of the stack memory 114 being allocated to the second emergency intervention system 12 using the switching apparatus 11 on the basis of the synchronized switching signal parameters 111. The activation parameters and/or activation signal data may additionally comprise storable and protected data tokens with cash sum values, for example. The data tokens can be generated in encrypted and/or electronically signed form. The encryption can be performed using public key cryptography and/or SSL (Secure Sockets Layer) and/or HTTPS.

A filter module 120 in the electronic switching apparatus 11, which module comprises a fault memory module 118 and a fault stack memory 119, is used to decrement a predefined fault stack memory value on the basis of the dedicated activation signals. The activation signals are generated with a quantitative weighting in line with the malfunction parameters on the basis of the activation of the intervention means 40 using the first emergency intervention system 10. When the first synchronized signal threshold value parameter is reached by the fault stack memory value for the fault stack memory 119, the enabling of the first emergency intervention system 10 is interrupted by means of the first activation apparatus 112 in the electronic switching apparatus 11 and the second emergency intervention system 12 is enabled by means of the second activation apparatus 113 in the electronic switching apparatus 11. When the second synchronized signal threshold value parameter is reached by the fault stack memory value, the enabling of the second emergency intervention system 10 is interrupted by means of the second activation apparatus 113 in the electronic switching apparatus 11 and the first emergency intervention system 12 is enabled for addressing malfunctions by means of the first activation apparatus 112. Using a network interface, the emergency intervention system 10/12 can access at least one decentralized database with associated stock-exchange or financial-institute parameters, for example. Hence, activation parameters can be based particularly on the transmitted stock-exchange or financial-institute parameters, for example. For the purpose of activation by means of the first and/or second activation apparatus 112/113, it is possible for at least one electronic activation signal to be generated on the basis of the transmitted malfunction parameters, for example, and for the activation signal to be transmitted to the intervention means 101, . . . , 105 and/or emergency intervention apparatuses 10/12.

In one exemplary embodiment, by way of example, a history module 40 can be taken as a basis for generating stored, chronologically coupled malfunction parameters and/or activation parameters in sync first synchronized signal threshold value parameters 1111 from the switching signal parameters 111 using the electronic switching apparatus 11. The history module 40 can be taken as a basis for generating and/or synchronizing stored, chronologically coupled malfunction parameters and/or activation parameters second synchronized signal threshold value parameters 112 from the switching signal parameters 111 using the electronic switching apparatus 11. By way of example, the history module 40 can use pareto methods with one parameter and/or a generalized pareto method with two parameters and/or a gamma method with two parameters and/or a log-normal method with two parameters and/or a log-gamma method with two parameters activation parameters and/or activation signal data which are to be expected are determined and/or synchronized. The history module 40 may comprise at least one Monte Carlo module for generating stochastic data, for example. The electronic switching apparatus 11 and/or the history module 40 may comprise an additional filter module, for example, with historical data in databases arranged in decentralized fashion via a network being selected on the basis of determinable risks and/or technical apparatuses and being stored in a memory unit. On the basis of the malfunction parameters, it is also possible to transmit clearing data to a clearing module in the electronic switching apparatus 11, for example. The clearing data may comprise settlement data for the activation of the second emergency intervention system 12 and/or may be associated with the first emergency intervention system 10. The same applies to settlement data for activation. The clearing module may be in a form such that the second emergency intervention system 12 is enabled for activation only on the basis of received clearing data. The generated activation signals can also be used to transmit electronically signed settlement receipts via the electronic switching apparatus 11.

For implementation, it is clear that the electronic switching apparatus and/or the emergency intervention systems 10/12 may comprise one or more different physical network interfaces, for example, which may also support a plurality of different network standards. The physical network interfaces may include, by way of example, interfaces to WLAN (Wireless Local Area Network), Bluetooth, GSM (Global System for Mobile Communication), GPRS (Generalized Packet Radio Service), USSD (Unstructured Supplementary Services Data), UMTS (Universal Mobile Telecommunications System) and/or Ethernet or another wired LAN (Local Area Network) etc. Accordingly, the network 50 may represent various heterogeneous networks, such as a Bluetooth network, e.g. for installations in covered localities, a mobile radio network with GSM and/or UMTS etc., a wireless LAN, e.g. based on IEEE wireless 802.1x, or else a wired LAN, i.e. a local area landline network, particularly also the PSTN (Public Switched Telephone Network) etc. In principle, it can be stated that the method and/or system is not tied to specific network standards provided that the inventive features are in place.

For the purpose of synchronization and/or activation in the case of partially cash-value-based systems, for example, the electronic switching apparatus 11 may comprise a first determinable parameter which corresponds to a first limit value $V_1$ which comprises the probability of a malfunction arising in a selected range $F_1=[S_1, S_2]$ in line with a cash value sum for the damage. This range is located on one side of said reference value or mean value $G_E$, in this case on the right-hand side of the value E (or $G_E$). This first range of values therefore corresponds to a loss rate or damage rate of greater than 100%. This first range of values for damage rates accordingly covers those values for which the first emergency intervention system 10 does not wish to undertake any risks or cash sum values for damaging events and for which it wishes to activate the second emergency intervention system 12 (e.g. the reinsurance systems), i.e. which is to transfer the risks to the second emergency intervention system 12. By way of example, the first range $F_1$ may comprise a loss rate of between 120% and 150%. The first limit value $V_1$ may be an expected value for the loss rate, for example, which is undertaken by the second emergency intervention system 12 (e.g. the reinsurance system). This corresponds to the mean value for the damage, including the first range. The first limit value $V_1$ is based on the curve generated by the analysis means, for example, in order to determine the expected value for the loss rate in the first range. This corresponds to the area beneath the curve within the range $F_1$. By way of example, the second emergency intervention system 12 may also be associated with the expected value for the loss rate $V_1$ in the first range. Quite generally, $V_1$ can be described as a clear demarcating parameter. The second emergency intervention system 12 takes the parameter $V_1$ as a basis for determining the fee (e.g. a cash sum value as a premium) which the first emergency intervention system 10 needs to transfer as a reward for the risk undertaken. By way of example, the cash sum value for the premium may be based on the parameter $V_1$, a management fee, a default interest rate for the fixed capital and a profit margin for the second emergency intervention system 12. This fee can be transferred periodically, for example, e.g. at the start of a year of occurrence (policy). Other fee models may also make sense, however, without thereby affecting the essence of the invention. In this case, the fee is therefore transferred (or paid) in advance on the basis of the determined probability of a loss rate. As one variant embodiment, the first emergency intervention system 10 can, by way of example, transfer the necessary parameters via the network 50 to the second emergency intervention system 12 and/or the electronic switching apparatus 11, for example. In this case, the second emergency intervention system 12 uses the aforementioned analysis means to determine, by means of a storable parameter, the technical expected value $V_1$ as a threshold value for the loss rate in the range $F_1=[S_1, S_2]$ in order to determine the fee which needs to be transferred from the first emergency intervention system 10 to the second emergency intervention system 12, or what rate needs to be borne by the first emergency intervention system 10 and what rate needs to be borne by the second emergency intervention system 12. As mentioned, the communication network 50 comprises a GSM or UMTS network, for example, or a satellite-based mobile radio network, and/or one or more landline networks, for example the public switched telephone network, the worldwide Internet or a suitable LAN (Local Area Network) or WAN (Wide Area Network). In particular, it also includes ISDN and XDSL connections. The threshold value parameter $S_1$ subsequently corresponds to the maximum value for the loss or damage which still needs to be covered just by the central unit. This can be determined in advance by the first emergency intervention system 10, for example, and transmitted to the second emergency intervention system 12 or electronic switching apparatus 11 as a constraint parameter. The threshold value parameter $S_2$ subsequently corresponds to the upper limit above which the second emergency intervention system 12 no longer undertakes the risk for indemnity coverage from the first emergency intervention system 10. The second emergency intervention system 12 can vary the parameter $S_2$ on the basis of the technical expected value for the fee. The variation can continue until the second emergency intervention system 12 receives confirmation of acceptance by the first emergency intervention system 10. This process is part of the synchronization and takes place using the synchronization modules or a synchronization apparatus. The synchronization between the second emergency intervention system 12 and the first emergency intervention system 10 may also comprise condition parameters, for example, such as fee level, time of fee (e.g. that the second emergency intervention system 12 is activated for indemnity coverage at the end of the year). The second emergency intervention system 12 can be activated whenever the effective loss or damage rate is in the range $S_1$ and $S_2$ or above the range, e.g. for a covered period (e.g. a year) for which the fee has been transferred to the second emergency intervention system 12.

In line with the inventive system, the system comprises all the necessary means for determining the expected value and/or the corresponding curve automatically and/or at least partially automatically. For this, the system can use a memory unit from the second emergency intervention system 12 (FIG. 1), for example. The data stored in the memory unit can be updated periodically and/or upon a request from the system and/or a user, for example. To this end, the system can use one or more networks, for example, to access databases in a delocalized arrangement. By way of example, the databases may be directly associated with user apparatuses or may be associated with national, partly national or private survey research institutes etc. By way of example, the system can check whether the indemnity coverage is within the first range. If this is the case, the agreed portion is transferred to the second emergency intervention system 12 or the second emergency intervention system 12 is activated for the agreed portion. If this is not the case, the indemnity coverage is resolved solely by the first emergency intervention system 10. As mentioned, the second emergency intervention system 12 comprises the necessary means, such as the analysis means, for determining the first threshold value $S_1$ and the upper threshold value $S_2$, which corresponds to the damage risks in a determinable period of occurrence. The second emergency intervention system 12 and/or the electronic switching apparatus 11 is therefore able to undertake the risks which are within the range between $S_1$ and $S_2$. Equally, the second emergency intervention system 12 comprises the means for determining the necessary premiums or fees and transferring them to the one or more first emergency intervention system(s) 10. If the first emergency intervention system 10 has transferred the necessary parameters to the second emergency intervention system 12, for example via the network 50 and/or the electronic switching apparatus 11, then the second emergency intervention system 12 uses the analysis means to determine the technical expected value $V_1$ as a threshold value for the loss rate in the range $F_1=[S_1, S_2]$ using a storable parameter, in order to determine the fee which needs to be transferred from the first emergency intervention system 10 to the second emergency intervention system 12, or what rate needs to be borne by the first emergency intervention system 10 and what rate needs to be borne by the second emergency intervention system 12. For the loss rate in the range $F_1=[S'_1, S'_2]$, a fee is transferred from the first emergency intervention system 10 to the second emergency intervention system 12. However, the fee or the cash sum values to be transferred as premiums are based on a risk occurrence prediction which is unfavorable for the first emergency intervention system 10. In addition, the fee usually needs to be paid to the second emergency intervention system 12 by the first emergency intervention system 10 before or at the start of the period of coverage for the installation 30. The first emergency intervention system 10 therefore needs to pay fees to the second emergency intervention system 12 for unfavorable risk predictions, which risks are not known to any degree at all. Another difficulty is the size of the "activation range", i.e. the zone between $S_1$ and $S_2$, which is usually determined such that it portrays a fundamental portion of the fee or cash sum values for the premiums which are received by the first emergency intervention system 10. The first emergency intervention system 10 is therefore perforce compelled to take this into account too, e.g. when calculating the premiums between the first emergency intervention system 10 and the one or more installation(s) associated with the sensor system 301/302/303/304, just as the second emergency intervention system 12 does when taking account of the risks on the basis of the probability of occurrence of the risks. This multiple dependence can generate an unnecessary rise in cost. In addition, it is extremely difficult, when synchronizing the first emergency intervention system 10 with the second emergency intervention system 12, to take account of all desired constraints both from the first emergency intervention system 10 and from the second emergency intervention system 12. Both make it extremely difficult to correctly determine fee etc. on the basis of the predictions, even if the calculations are performed separately and/or in parallel both by the first emergency intervention system 10 and by the second emergency intervention system 12 and even if the calculations dispense with unnecessary substantiations. In the conventional examples from the prior art, the curve is normally not good enough to describe the values of G. Usually, synchronization of the second emergency intervention system 12 and of the first emergency intervention system 10 presupposes extremely accurate local adaptations. Since the synchronization in the prior art is a long way from being automated or at least partially automated, however, such local synchronizations to particular technical areas or user apparatus groups cannot be performed. Therefore, the prior art usually involves the synchronization being performed well only for a particular area of the curve, while the rest is poorly described or covered. By way of example, conventional synchronization based on an SL agreement within the range $F_1$ can work very well, while it works very poorly outside of the range. This problem cannot be solved by any prior art.

To get around these drawbacks of the prior art, the inventive system comprises at least one further range besides the range $F_1$. The choice of weight or magnitude parameters for this second range $F_2$, i.e. that is to say the range itself, is at least to some extent different than that for the range $F_1$. This modeling, comprising a multiplicity of models, can be performed with the inventive system using a single model or based on a single basic structure.

It may make sense to use, by way of example, curves of the log-normal or log-gamma type with two parameters etc. using the analysis means, since they can frequently be better matched to more global constraints. In one variant embodiment, it is also possible to use two different curves to model the first and the second range. By way of example, the following configuration is considerable: (i) pareto (1 parameter), (ii) generalized pareto (2 parameters), (iii) gamma (2 parameters). In another variant embodiment, the system comprises just a single curve so as not only to describe all G in acceptable fashion but also the values of G in the two ranges $F_1$ and $F_2$, $F_2$ being described more accurately further below. Besides the system or apparatus and the method, the invention also covers the appropriate software for carrying out the inventive method. As described previously, the variant embodiment comprises a memory module, analysis means and a first determinable parameter. For modeling, the analysis means comprise either a single curve or a plurality of curves. The electronic switching apparatus 11 and/or the emergency intervention systems 10/12 may also comprise at least one second determinable parameter and the activation modules and synchronization modules. The second determinable parameter comprises a second threshold value parameter $V_2$ which corresponds to a probability of risks and/or indemnity coverage arising which are in the second range $F_2$. In the present exemplary embodiment, the second range $F_2$ is 100%, i.e. wholly, on the other side of the value parameter E, for example. Consequently, the second range $F_2$ can also cover occurrence values for indemnity coverage which are lower than 100%, i.e. lower than the values which would need to be undertaken exclusively by the first emergency intervention system 10 in the prior art. The second range $F_2=[S_1', S_2']$ can usefully correspond to a range of values for which the cash sum value of the fees transferred to the first emergency intervention system 10 is higher than the effective damage total and for which the first emergency intervention system 10 makes a profit. As an example, the second range may comprise values of $S_1'=40\%$ and $S_2'=70\%$, as illustrated in FIG. 2. The second threshold value parameter $V_2$ may correspond to an expected value for the indemnity coverage total or risks accumulated in the period of occurrence, for example. The second determinable parameter is based on the curve generated using the analysis means in order to determine the second threshold value parameter $V_2$ for the risks in the range $F_2$. Using the expected value $V_2$ for the risks or their expected damage totals in the second range, the analysis means determine a cash value sum for a complementary premium $P_c$ which the first emergency intervention system 10 will transfer, i.e. pay, if the first emergency intervention system 10 can produce the profit in line with the second range $F_2$. This complementary premium and/or fee $P_c$ is determined particularly on the basis of the excepted value for the risks $V_2$ in the second range using the analysis means. Using the variable parameter and the analysis means, the second range $F_2$ can be adjusted on the basis of the expected value $V_2$ for the risks in the second range, so that the complementary premium $P_c$ compensates for a portion of the curve for which all or some of the risks or the transferred cash sum values for covering the risks are transferred by the second emergency intervention system 12. The latter risks are rendered by the expected value for the damage in the first range $V_1$. As mentioned, the variant embodiment comprises the activation modules and synchronization modules for adjusting the parameters in the second range. Using the synchronization modules, the parameters are adjusted up to a desired ratio, e.g. a balance between the expected value for the risks in the first range $V_1$ (which corresponds to the risk parameters transferred to the second emergency intervention system 12) and the expected value for the risks in the second range $V_2$ (which corresponds to the portion of the profit transferred to the second emergency intervention system 12 by the first emergency intervention system 10). The parameters in the second range may comprise the upper threshold value $F_2$ for the second range, for example. The upper threshold value $F_2$ can be determined by means of the first or second emergency intervention system 10 or the electronic switching apparatus 11, for example, and transferred to the second emergency intervention system 12 as a constraint parameter. Other synchronizations between the first emergency intervention system 10 and the second emergency intervention system 12 are also conceivable as a variant embodiment, however, for example by virtue of the second emergency intervention system 12 determining the threshold value parameter $F_2$. The synchronization method may comprise the following steps, inter alia:

(i) An appropriate filter module is used to generate data for risks which have effectively arisen by means of access to appropriate databases, and said data are stored, for example as weight factors (S/P), in a memory unit in association with a technical apparatus and/or area. The databases may be arranged in decentralized fashion from the first emergency intervention system 10 and can be accessed via a network 50. By way of example, the communication network 50 comprises a GSM or a UMTS network, or a satellite-based mobile radio network, and/or one or more landline networks, for example the public switched telephone network, the worldwide Internet or a suitable LAN (Local Area Network) or WAN (Wide Area Network). In particular, it also comprises ISDN and XDSL connections. Data can be understood to mean, inter alia, digital data such as text, graphics, images, maps, animations, moving pictures, video, Quicktime, sound recordings, programs (software), program-accompanying data and hyperlinks or references to multimedia data. These also include MPx (MP3) or MPEGx (MPEG4 or 7) standards, for example, as defined by the Moving Picture Experts Group.

(ii) An extrapolation module is used to propagate the filtered data to future time intervals as expected values for risks or damage and to store them in association as an appropriate curve and/or function, for example.

(iii) For the values of the curve, the analysis means are used to determine a value parameter $G_E$. The value parameter $G_E$ may correspond to a mean value, for example, which the first emergency intervention system 10 needs to compensate for as much damage as it has received premiums from user apparatuses associated with the sensor system 301/302/303/304. $G_E$ may be based on a value S/P=1, for example.

(iv) The analysis means in the variant embodiment are used to determine a first threshold value parameter $V_1$ which is associated with the probability that the effectively arising risks are in the range $F_1$. In one exemplary embodiment, the first range $F_1$ may be chosen such that it is on one side of the variable factor $G_E$.

(v) The analysis means 2 in the system are used to determine a second threshold value parameter $V_2$ which is associated with the probability of the effectively arising risk being in the range $F_2$. As one exemplary embodiment, $F_2$ may be at least partially situated on the other side of $G_E$ in comparison with the first range $F_1$.

(vi) Reciprocal adjustment of the relevant parameters in the second range $F_2$ on the basis of a determinable ratio between at least the first threshold value parameter $V_1$ and the second threshold value parameter $V_2$.

In one exemplary embodiment, the ranges can be adjusted in steps (iv) and (v) on the basis of a weight factor S/P=1, for example, by demarcating the limit values for the ranges from one another using $G_E$, as described, or aligning them. The limit parameters $V_1$, $V_2$, etc. for the ranges can either be transmitted to the other unit unilaterally by the respective unit (first emergency intervention system 10, second emergency intervention system 12) as a constraint factor (i.e. effective constraint) or can be reciprocally adjusted until a determinable match has been reached between the emergency intervention systems 10 and 12. The first emergency intervention system 10 can remunerate the second emergency intervention system 12 for the transferred risk in the first range $F_1$ using a complementary premium $P_c$ corresponding to a portion of the profit from the first range, as described. The complementary premium $P_c$ can be used to significantly reduce the conventional fee from the prior art, which conventional fee is based merely on the expected values for the first range for the occurrence of the risks in a particular period of occurrence. In particular, the fee can also be provided by the inventive apparatus as a result of the reduced management costs and the profits of the second emergency intervention system 12. It is also conceivable for the complementary fee $P_c$ not to be transferred until one of the advantageous situations resulting from the second range $F_2$ [40%, 70%] has effectively arisen. Another advantage of the inventive system is that, in comparison with the systems from the prior art, it is flexibly and automatically adjusted to the individual circumstances and/or peculiarities between the first emergency intervention system 10 and the second emergency intervention system 12. This is not possible in this fashion with any system from the prior art. In contrast to the prior art, the first emergency intervention system 10 can use the inventive system not only to transfer entire risks to the second emergency intervention system 12 but also to share risks in a new manner, such that its profit is maximized but, in the event of risks with an extraordinarily high indemnity coverage effectively arising, such as floods or earthquakes, the first emergency intervention system 10 does not encounter a financial disaster. In the case of the invention, the first emergency intervention system 10 can reduce the fee by the user apparatus associated with the sensor system 301/302/303/304, which makes it more attractive to the market. The invention therefore allows the first emergency intervention system 10 to reduce the constraints for a possible fee for damage by the first emergency intervention system 10, which makes the entire system more flexible. When this inventive variant embodiment is used, the first emergency intervention system 10 pays the stated additional complementary premium $P_c$ to the second emergency intervention system 12 for a situation based on the second range, i.e. when the level of damage incidence produces a situation which is advantageous for the first emergency intervention system 10 (advantageous on the basis of the ratio of premiums to damage totals). For this exemplary embodiment with cash-sum-value-based emergency intervention systems, this allows the first emergency intervention system 10 to increase its number of supported user apparatuses, to optimize the cash sum values stored as security and to minimize the difference between the indemnity coverages which arise annually or at other intervals.

The invention claimed is:

1. A method for electronically switching first and second autonomous emergency intervention systems that are configured to redress malfunctions for a local device having a sensor system, the sensor system configured to detect a malfunction event in the local device and to send malfunction parameters to an electronic switching apparatus, at least one of the first and the second autonomous emergency intervention system able to select a intervention device from a plurality of intervention devices that are configured to redress the malfunction event of the local device, the electronic switching apparatus having an incremental stack memory and a fault stack memory, and being in bi-directional connection with the first and the second autonomous emergency intervention systems, the method comprising:

synchronizing switching signal parameters for the first and the second autonomous emergency intervention system by the electronic switching apparatus, the switching signal parameters including a first and second synchronized signal threshold parameters;

allocating the local device to the incremental stack memory of the electronic switching apparatus;

periodically transmitting activation parameters from the local device to the electronic switching apparatus via an interface module of the electronic switching apparatus;

incrementing the incremental stack memory of the electronic switching apparatus based on the activation parameters received from the local device;

detecting a stack memory level of the incremental stack memory by a switching module of the electronic switching apparatus;

enabling the first autonomous emergency intervention system to address the malfunction event of the local device, by using activation signals of the switching module of the electronic switching apparatus, if the detected stack memory level reaches a predetermined threshold;

allocating a part of the incremental stack memory to the second autonomous emergency intervention system as the fault stack memory based on the switching signal parameters;

decrementing the fault stack memory level of the fault stack memory based on dedicated activation signals, the dedicated activation signals being weighted based on the malfunction parameters send by the sensor system;

interrupting the first autonomous emergency intervention system by a first activation apparatus of the electronic switching apparatus, and enabling the second autonomous emergency intervention system by a second activation apparatus of the electronic switching apparatus, in a case where the decremented fault stack memory level reaches the first synchronized signal threshold parameter; and interrupting the second autonomous emergency intervention system by the second activation apparatus of the electronic switching apparatus, and enabling the first autonomous emergency intervention system by the first activation apparatus of the electronic switching apparatus, in a case where the decremented fault stack memory level reaches the second synchronized signal threshold parameter.

2. The method of electronically switching first and second autonomous emergency intervention systems according to claim 1, the method further comprising:

generating an electronic activation signal by at least one of the first and the second activation apparatuses of the electronic switching apparatus, based on the malfunction parameters send by the sensor system; and transmitting the electronic activation signal to at least one of the plurality of intervention devices and to at least one of the first and the second autonomous emergency intervention system.

3. The method of electronically switching first and second autonomous emergency intervention systems according to claim 1, the method further comprising:

generating chronologically coupled malfunction parameters based on the malfunction parameters send by the sensor system with a history module at the electronic switching apparatus that are synchronous with the first synchronized signal threshold parameter of the switching signal parameters of the electronic switching apparatus.

4. The method of electronically switching first and second autonomous emergency intervention systems according to claim 1, the method further comprising:

generating chronologically coupled malfunction parameters based on the malfunction parameters send by the sensor system with a history module at the electronic switching apparatus that are synchronous with the second synchronized signal threshold parameter of the switching signal parameters of the electronic switching apparatus.

5. The method of electronically switching first and second autonomous emergency intervention systems according to claim 1, the method further comprising:
assigning a cash sum value as a protected data token to the activation parameters of the local device.

6. The method of electronically switching first and second autonomous emergency intervention systems according to claim 1, the method further comprising:
transmitting clearing data to a clearing module of the electronic switching apparatus, the clearing data calculated based on a value of the malfunction parameters,
wherein the clearing data further comprises settlement data for said enabling the second autonomous emergency intervention system by a second activation apparatus, and the clearing data is further associated with the first autonomous emergency intervention system.

7. The method of electronically switching first and second autonomous emergency intervention systems according to claim 6, the method further comprising:
enabling the second autonomous emergency intervention system by the clearing module only based on the clearing data.

8. The method of electronically switching first and second autonomous emergency intervention systems according to claim 1, the method further comprising:
transmitting electronically signed settlement receipts when the activation signals of the electronic switching apparatus are used.

9. An electronic switching apparatus for electronically switching first and second autonomous emergency intervention systems that are configured to redress malfunctions for a local device having a sensor system, the sensor system configured to detect a malfunction event in the local device and to send malfunction parameters to the electronic switching apparatus, at least one of the first and the second autonomous emergency intervention system able to select a intervention device from a plurality of intervention devices that are configured to redress the malfunction event of the local device, the electronic switching apparatus comprising:
an incremental stack memory;
a fault stack memory;
a switching module; and
a communication interface module to be in bi-directional connection with the first and the second autonomous emergency intervention systems,
the electronic switching apparatus configured
to synchronize switching signal parameters for the first and the second autonomous emergency intervention system, the switching signal parameters including a first and second synchronized signal threshold parameters;
to allocate the local device to the incremental stack memory;
to periodically receive activation parameters from the local device via the communication interface module;
to increment the incremental stack memory based on the activation parameters received from the local device;
to detect a stack memory level of the incremental stack memory by the switching module;
to enable the first autonomous emergency intervention system to address the malfunction event of the local device, by using activation signals of the switching module, if the detected stack memory level reaches a predetermined threshold;
to allocate a part of the incremental stack memory to the second autonomous emergency intervention system as the fault stack memory based on the switching signal parameters;
to decrement the fault stack memory level of the fault stack memory based on dedicated activation signals, the dedicated activation signals being weighted based on the malfunction parameters send by the sensor system;
to interrupt the first autonomous emergency intervention system by a first activation apparatus of the electronic switching apparatus, and to enable the second autonomous emergency intervention system by a second activation apparatus of the electronic switching apparatus, in a case where the decremented fault stack memory level reaches the first synchronized signal threshold parameter; and
to interrupt the second autonomous emergency intervention system by the second activation apparatus, and to enable the first autonomous emergency intervention system by the first activation apparatus, in a case where the decremented fault stack memory level reaches the second synchronized signal threshold parameter.

10. The electronic switching apparatus for electronically switching first and second autonomous emergency intervention systems according to claim 9, the electronic switching apparatus further configured
to generate an electronic activation signal by at least one of the first and the second activation apparatuses, based on the malfunction parameters send by the sensor system; and
to transmit the electronic activation signal to at least one of the plurality of intervention devices and to at least one of the first and the second autonomous emergency intervention system.

11. The electronic switching apparatus for electronically switching first and second autonomous emergency intervention systems according to claim 9, the electronic switching apparatus further including a history module, and further configured
to generate chronologically coupled malfunction parameters based on the malfunction parameters send by the sensor system with the history module that are synchronous with the first synchronized signal threshold parameter of the switching signal parameters.

12. The electronic switching apparatus for electronically switching first and second autonomous emergency intervention systems according to claim 9, the electronic switching apparatus further including a history module, and further configured
to generate chronologically coupled malfunction parameters based on the malfunction parameters send by the sensor system with the history module that are synchronous with the second synchronized signal threshold parameter of the switching signal parameters of the electronic switching apparatus.

13. The electronic switching apparatus for electronically switching first and second autonomous emergency intervention systems according to claim 9, the electronic switching apparatus further configured
to assign a cash sum value as a protected data token to the activation parameters of the local device.

14. The electronic switching apparatus for electronically switching first and second autonomous emergency intervention systems according to claim 9, the electronic switching apparatus further including a clearing module, and further configured to transmit clearing data to the clearing module, the clearing data calculated based on a value of the malfunction parameters, wherein the clearing data further comprises settlement data for said enabling the second autonomous emergency intervention system by a second activation apparatus, and the clearing data is further associated with the first autonomous emergency intervention system.

15. The electronic switching apparatus for electronically switching first and second autonomous emergency intervention systems according to claim 14, the electronic switching apparatus further configured to enable the second autonomous emergency intervention system by the clearing module only based on the clearing data.

16. The electronic switching apparatus for electronically switching first and second autonomous emergency intervention systems according to claim 9, the electronic switching apparatus further configured to transmit electronically signed settlement receipts when the activation signals of the electronic switching apparatus are used.

\* \* \* \* \*

UNITED STATES PATENT AND TRADEMARK OFFICE
CERTIFICATE OF CORRECTION

PATENT NO. : 7,899,560 B2  
APPLICATION NO. : 11/971702  
DATED : March 1, 2011  
INVENTOR(S) : Vincent Eck Page 1 of 1

It is certified that error appears in the above-identified patent and that said Letters Patent is hereby corrected as shown below:

On the title page, Item (30), delete the Foreign Application Data:
"(30) Foreign Application Priority Data
Jan. 9, 2007 (EP) PCT/EP07/50179."

On the title page, insert Item (63):
--(63) Related U.S. Application Data
Continuation of application No. PCT/EP2007/050179, filed January 9, 2007.--

Signed and Sealed this
Sixth Day of November, 2012

David J. Kappos
*Director of the United States Patent and Trademark Office*